Fig. 1

Inventor
WALTER D. ARCHEA

Fig. 3

Oct. 9, 1934.  W. D. ARCHEA  1,976,108
MILLING MACHINE
Filed Feb. 29, 1932   8 Sheets-Sheet 4

Inventor
WALTER D. ARCHEA

By AHParsons
Attorney

Oct. 9, 1934.  W. D. ARCHEA  1,976,108
MILLING MACHINE
Filed Feb. 29, 1932   8 Sheets-Sheet 5

Inventor
WALTER D. ARCHEA
By H. K. Parsons
Attorney

Oct. 9, 1934.   W. D. ARCHEA   1,976,108
MILLING MACHINE
Filed Feb. 29, 1932   8 Sheets-Sheet 6

Inventor
WALTER D. ARCHEA

By HH Parsons
Attorney

Fig. 15

Patented Oct. 9, 1934

1,976,108

UNITED STATES PATENT OFFICE 1,976,108

MILLING MACHINE

Walter D. Archea, Cincinnati, Ohio, assignor to The Cincinnati Milling Machine Company, Cincinnati, Ohio, a corporation of Ohio Application February 29, 1932, Serial No. 595,787

24 Claims. (Cl. 90—21.5)

This invention relates to milling machines and more particularly to an improved automatic machine for milling rounded end elongated slots, splines, grooves or recesses in the solid face of a work piece.

In the formation of elongated depressions in the solid face of a work piece, it is customary to sink the cutting tool into the work to the desired depth to form one end of the slot, traverse the work and repeat the cutting operation to form the other end of the slot, and then traverse the work relative to the tool to remove the intermediate material. The first operation requires a relative movement between tool and work toward and from each other, while the other machining operation is effected by a lateral movement of one relative to the other.

It is one of the principal objects of this invention to provide an improved automatic machine for performing these operations in a continuous automatic cycle, thereby reducing the operator's duties to that of changing the work and starting the machine.

Another object of this invention is to provide improved control mechanism for a plurality of hydraulically actuated slides of a machine tool capable of effecting relative movement in a plurality of directions between tool and work whereby any moving slide may automatically vary or modify its own movement and/or initiate movement of a stationary slide.

A further object of this invention is to provide an automatic drum control unit for determining the sequential order of movement of a plurality of hydraulically actuated slides and thereby the cycle of the machine, together with adjustable means whereby movement may be initiated at any point in the cycle irrespective of the point thereof at which the parts stopped.

Other objects and advantages of the present invention should be readily apparent by reference to the following specification considered in conjunction with the accompanying drawings illustrative of one embodiment thereof, but it will be understood that any modifications may be made in the specific structural details within the scope of the accompanying claims without departing from or exceeding the spirit of the invention.

Referring to the drawings, in which like reference numerals indicate like or similar parts.

Figure 1:
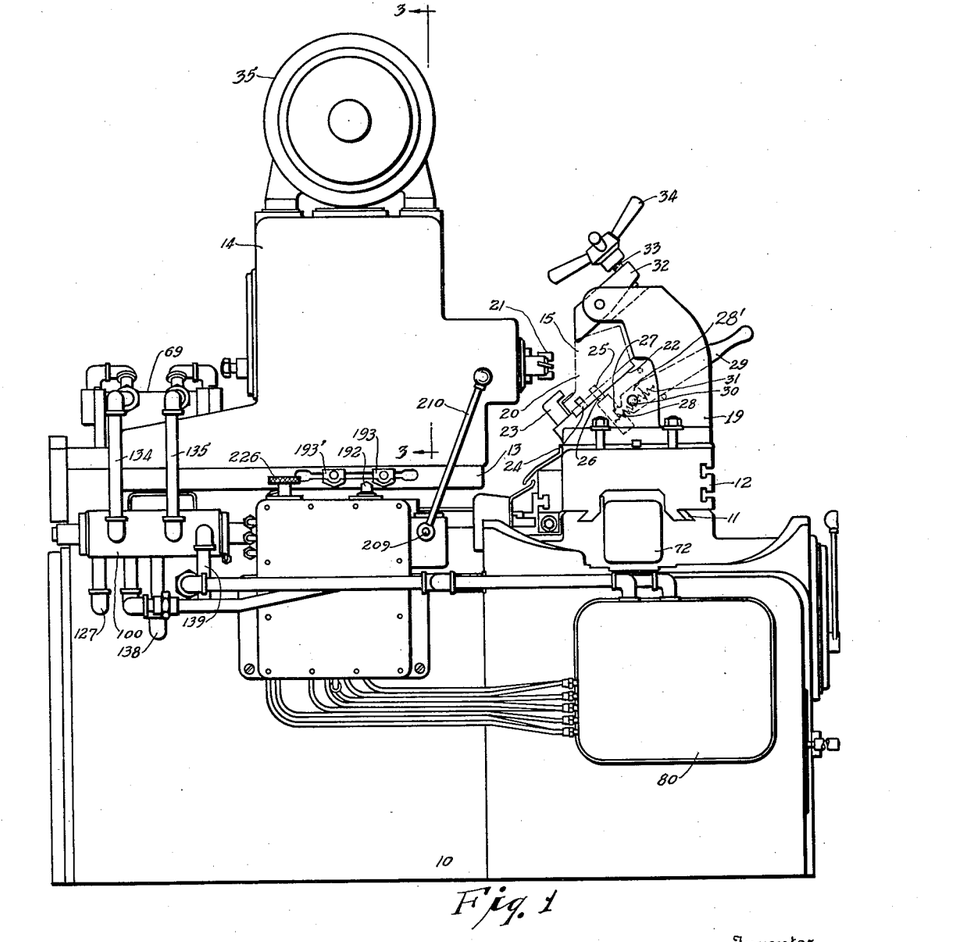
Figure 1 is a side elevation of a machine embodying the principles of this invention.

Referring to Figure 1, the reference numeral 10 indicates a support or bed of the machine, having longitudinal guideways 11 formed on the top thereof for receiving a work support 12, which is adapted to be reciprocated thereon by hydraulic means to be described later. A second pair of guideways 13 are formed on the top of the bed at right angles to the guideways 11 for receiving an hydraulically reciprocated tool head 14 which is movable toward and from the work support.

Figures 12, 13:
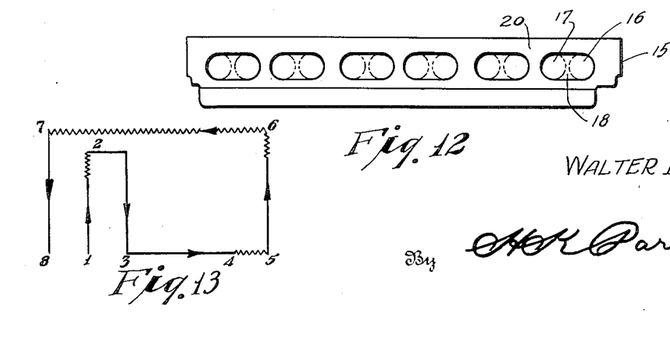
Figure 12 is a detail view of a work piece that may be milled in this machine.
Figure 13 is a diagrammatic view of a cycle of the machine.

In order to better understand the operation of this machine, reference may be had to Figure 12, which shows one of the machining operations that may be performed thereby on a work piece such as 15. In this particular work piece it is desired to mill a plurality of elongated slots in the solid face thereof, these slots, being of equal width and equal depth and having rounded ends. They may be required or utilized for any purpose, but in the present instance they constitute valve clearance spaces or recesses in the cylinder head of an internal combustion engine. The configuration or slot is formed in the present machine by first removing the metal in the area 16 as by an end milling or boring operation, after which the tool is withdrawn and the work shifted laterally a predetermined distance dependent on the length of the slot to be formed. The tool is then moved toward the work to remove the material illustrated diagrammatically by the area or circle 17; and after the tool has reached the desired depth it is held there while the work is traversed to remove the intermediate material illustrated by the area 18.

From this it will be seen that it is first necessary to effect relative movement of the tool head toward and from the work; then to traverse the work laterally relative to the tool head; again move the tool head toward the work; re-traverse the work back to starting position and finally re-return the tool head to starting position. The function of this machine is to perform these operations in continuous succession or in other words in one continuous automatic cycle thereby completing them in the shortest possible time.

The work piece 15 is mounted in a fixture 19, which is secured to the top of the work table 12, the fixture being of such shape as to support the work in proper position for the formation of recesses in the solid face 20 thereof by the cutters 21. The operator stands at the left of the machine, as viewed in Figure 2, and slides a work piece along the inclined face 22 being guided by the approximate stops 23 and 24. The under side of the work has a pair of previously drilled holes 25 therein which receive the aligning pins 26 reciprocably mounted in the base of the fixtures for uniformly locating work pieces relative to the cutter. Each pin 26 is provided with a recess 27 in the side thereof, into which fits the rounded end 28 of a short crank arm 28' keyed to the longitudinal shaft 30 in the fixture having the manual operating lever 29 on the end adjacent the operator's position. A spring 31 has one end attached to the fixture and the other end to the side of the handle in such relation to the axis thereof that the handle will remain in either one of two positions. The lever may be thrown upward to withdraw the pins while the work is being inserted in the machine, after which the lever will be thrown downward to cause insertion of the pins into the work to correctly position the same. The pivoted clamps 32 provided on the top of the fixture are now tightened against the top of the work by the manually actuated clamp screws 33. From this it will be seen that the operator can load and unload the machine from the left hand end thereof and quickly and accurately position each work piece in the same relation to the cutter, the aligning pins serving to hold the work temporarily on the supporting face 22 while the hand wheels are rotated to rigidly secure the work in the fixture.

As shown in Figure 12, the work piece illustrated has six elongated depressions therein and the present machine is equipped to mill these six depressions simultaneously, although of course, it will be understood that any number of depressions may be milled simultaneously without departing from the present invention.

Figure 3:
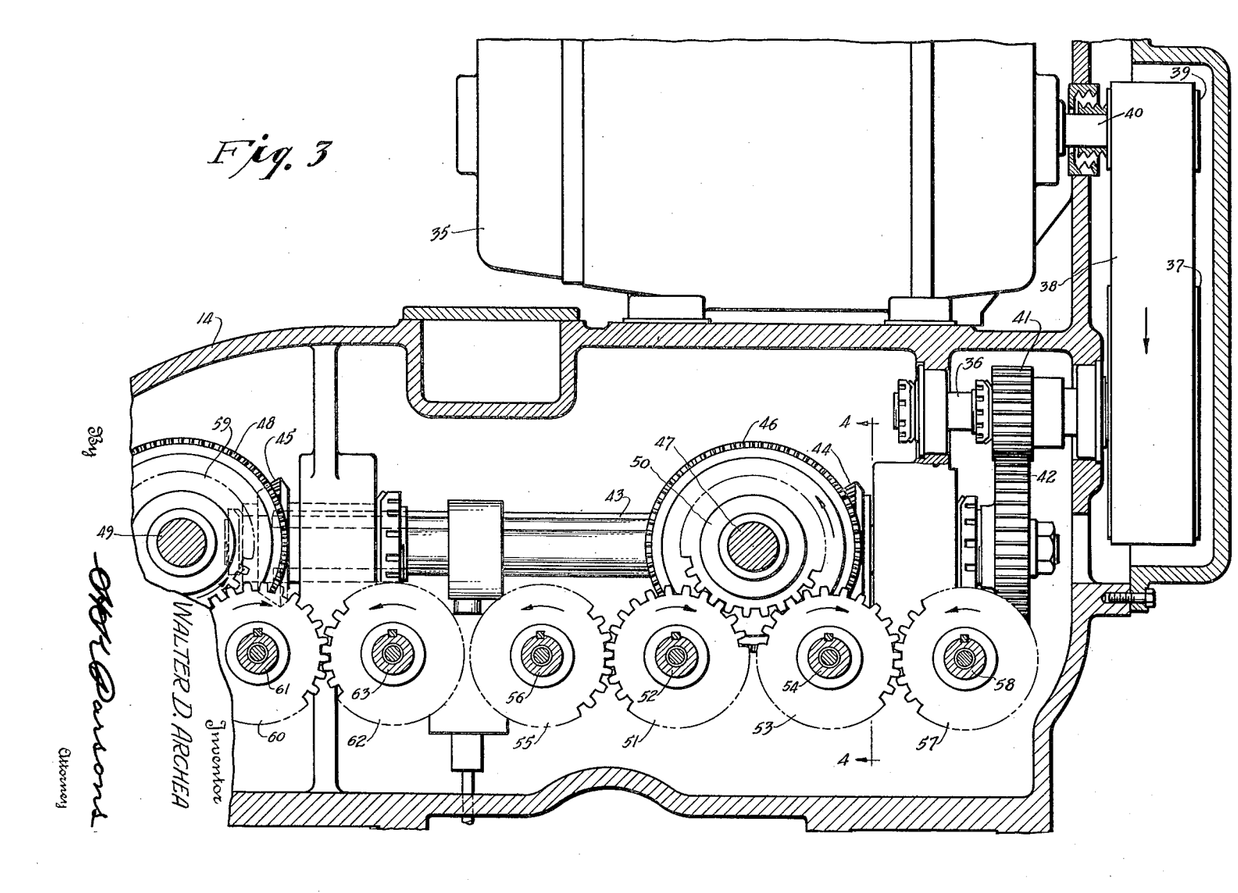
Figure 3 is a section on the line 3—3 of Figure 1.

The power transmission for the cutter spindles is more particularly illustrated in Figures 3 and 4 and will now be described. A prime mover 35, mounted on the top of the slide 14, drives the shaft 36 through the pulley 37 secured to the end of the shaft and the band or belt 38 which passes around the pulley 39 secured to the end of the motor armature shaft 40. The shaft 36 is journaled at opposite ends in the housing of the slide 14 and has a pinion 41 keyed thereto meshing with a gear 42 keyed to the end of a spline shaft 43, which extends substantially the full width of the housing. Spaced upon the shaft 43 is a pair of bevel gears 44 and 45, the bevel gear 44 meshing with a bevel gear 46 keyed to the end of stud shaft 47, and the bevel gear 45 meshing with the bevel gear 48 secured to the end of the stud shaft 49. The shaft 47 has a gear 50 keyed thereto which meshes simultaneously with the gear 51 of cutter spindle 52 and gear 53 of cutter spindle 54. The gear 51 drives gear 55 of cutter spindle 56 while the gear 53 meshes with a second gear 57 to drive cutter spindle 58. From this it will be seen that the gear 50 drives direct to a pair of cutter spindles and each one of the pair in turn actuate an adjacent spindle.

The stud shaft 49 has a gear 59 thereon meshing with the gear 60 keyed to the cutter spindle 61, the gear 60 meshing with a second gear 62 for driving the cutter spindle 63. By driving the spindles in this manner, it will be seen, by checking the arrows indicating direction of rotation of the spindles, that each pair of spindles rotate in opposite directions relative to each other, thereby equalizing the thrust on the work piece.

Figures 4, 14:
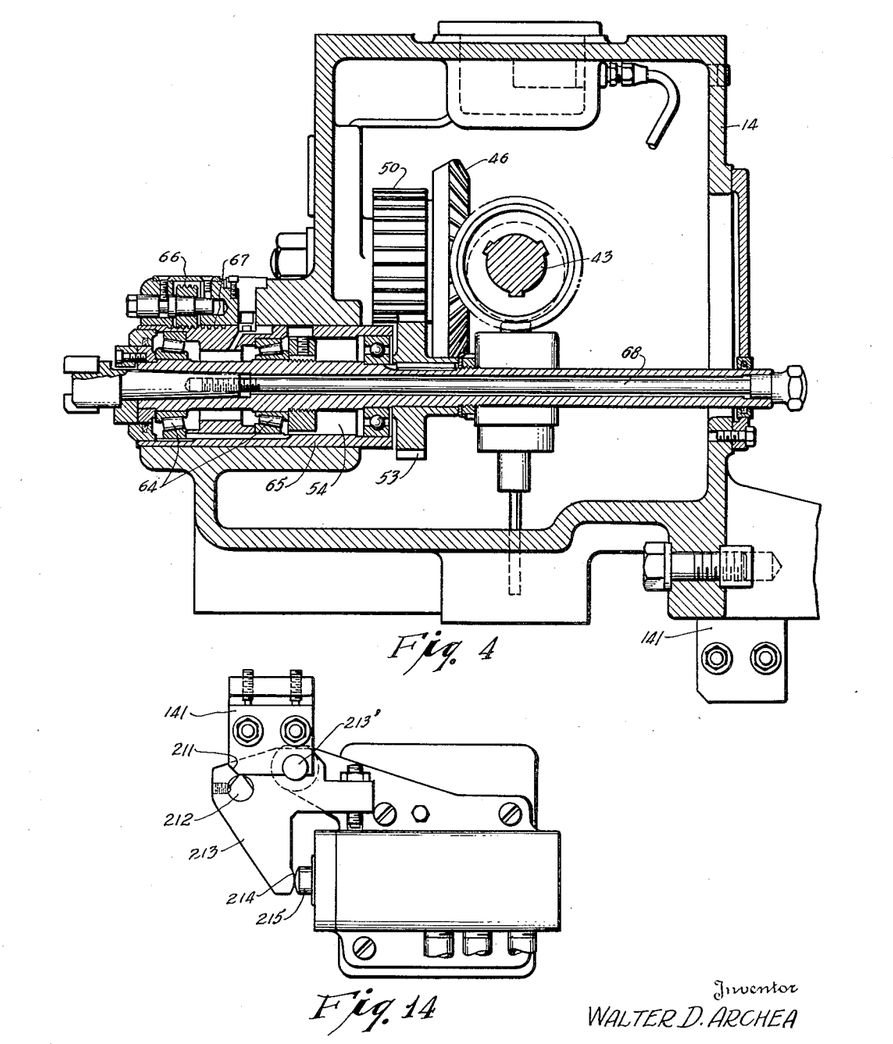
Figure 4 is a section on the line 4—4 of Figure 3.
Figure 14 is a detail view of the trip control for the feed throttle valve of the carrier.

Each cutter spindle is mounted in anti-friction bearings 64, as shown in Figure 4, the bearings being carried in a slidable quill 65 which may be longitudinally adjusted by means of the spiral gear 66 engaging the worm 67 formed in the periphery of the quill. By means of this mechanism, each spindle may be adjusted axially independently of the remaining spindles. A draw bolt 68 extends through each spindle and is operable from the rear of the machine for securing the cutter shanks in the spindle noses. In spite of the fact that each pair of spindles rotate in opposite directions, it is further desirable to mount the cutters in the spindles so that their teeth will be staggered relative to each other to further break up the thrust on the work piece and insure a smooth accurate cut. For this reason the gear on each spindle is meshed with its driving gear so that the key way in each spindle nose is at a different angle with a vertical thereby insuring that the cutters will be automatically varied with respect to each other upon assembly with the spindles. There has thus been provided a slidable tool head having a plurality of spindles, each of which is driven from a common transmission having its own prime mover mounted on the slide for movement therewith.

The spindle carrier or slide 14 and the work table or slide 12 are reciprocated in their respective guideways by hydraulically actuated means, the spindle carrier actuating means comprising a cylinder 69 having a piston 70 reciprocably mounted therein which is connected to its slide by means of the piston rod 71. The table has a cylinder 72 in which is reciprocably mounted a piston 73 connected to the table by means of the piston rod 74.

Figure 11:
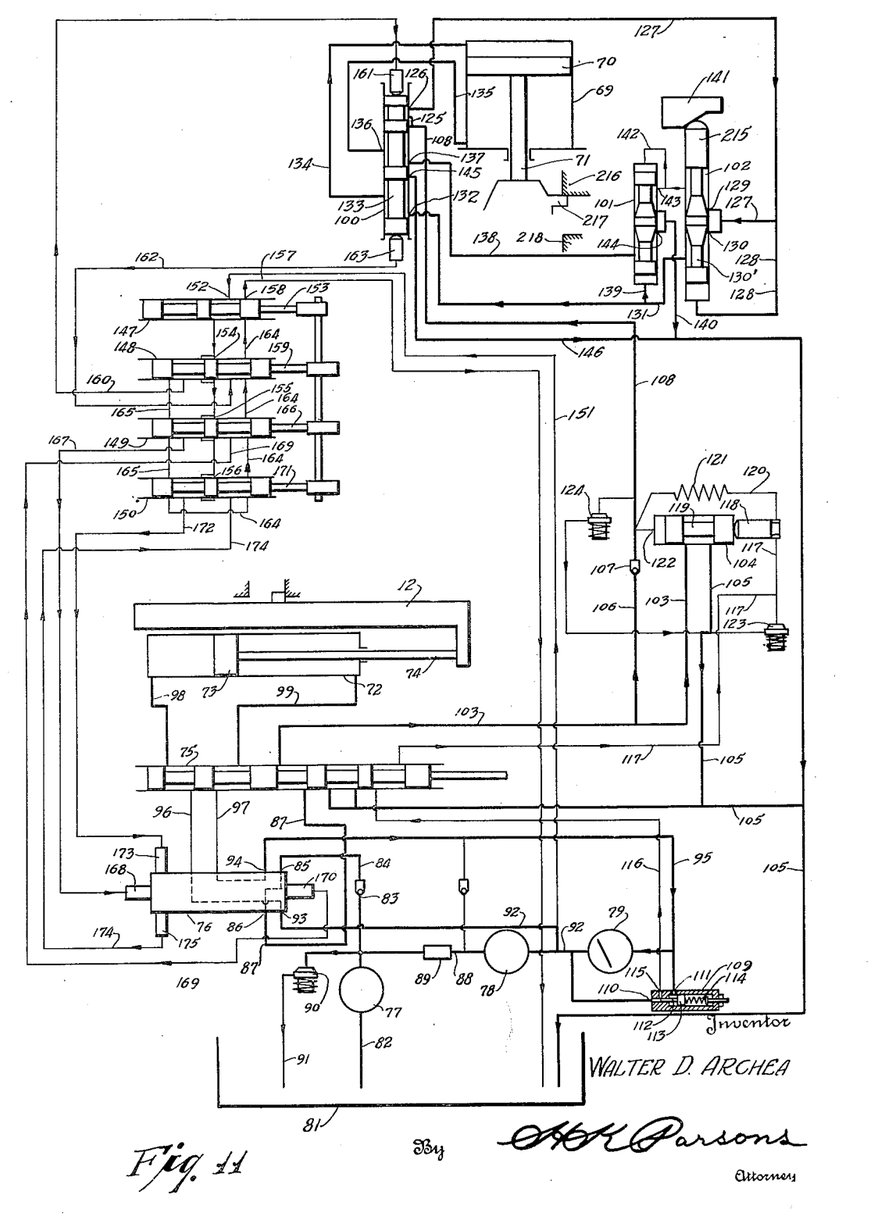
Figure 11 is a diagram of the hydraulic circuit of the machine.

The hydraulic circuit of the machine is diagrammatically illustrated in Figure 11, and the portion of the circuit utilized for actuating the table comprises mainly the stop valve 75, a selector valve 76 and three pumps, the rapid traverse pump 77, the booster pump 78 and the variable delivery pump 79. These parts constitute an hydraulic unit which may be assembled as such and inserted in the end of the bed as illustrated at 80 in Figures 1 and 2. The stop valve, selector valve and three pumps are connected together to form a known hydraulic circuit illustrated more particularly in co-pending application, Serial Number 220,721, filed September 15, 1927 and therefore will only be briefly explained here.

The rapid traverse pump 77 draws oil from the reservoir 81 through channel 82 and forces the same past the check valve 83 into channel 84 leading to the port 85 of the selector valve. If the selector valve 76 is in a feed position, the rapid traverse pump is not utilized and the port 85 is connected by the valve to the port 86 which has channel 87 leading therefrom. Ordinarily this channel would lead to reservoir but the flow therefrom is utilized for other purposes as will appear hereinafter. The rapid traverse pump also super-charges the booster pump 78 through channel 88 having the oil filter 89 therein, to insure that the oil entering the booster pump has been cleared of any sediment or other foreign material, which might be drawn from the reservoir.
To insure against excessive pressures being developed in the rapid traverse pump, a relief valve 90 has been provided which may be set at any desired pressure, the escaping excess oil being returned to reservoir through channel 91.
The booster pump supplies fluid to the main channel 92 as make-up for any losses in the system caused by leakages, etc. The variable delivery pump 79 is connected to the port 93 of the selector valve by the pressure channel 92 and to the port 94 of the selector valve by the return channel 95. When the rapid traverse pump is utilized for moving the table, the ports 93 and 94 are coupled together by the selector valve, thereby short-circuiting the pump 79 which keeps down the pressure and prevents excessive heating of the oil. A pair of channels 96 and 97 extend from the selector valve to the stop valve 75. When the stop valve is in the position shown in Figure 11, these channels are connected to channels 98 and 99 respectively, which extend to opposite ends of the cylinder 72. If the channels 96 and 97 are connected respectively with the ports 93 and 94 by the selector valve, the flow from the variable delivery pump will be conducted to the left hand end of cylinder 72, causing movement of the table to the right as viewed in Figure 11, the oil in the right hand end of the cylinder returning through channels 99, 97 and 95 to the intake side of the variable delivery pump. This constitutes a closed circuit, the fluid being withdrawn from one end of the table cylinder and forced in to the other end, the booster pump compensating for any leakages and thereby maintaining the system always filled with oil.
If connections between the channels 96 and 97 are reversed, with respect to the ports 93 and 94, it is apparent that pressure will now flow to the right hand end of the table cylinder, causing movement of the table to the left. In a similar manner, the channels 96 and 97 may be connected with the ports 86 and 85 respectively or in inverse order to effect rapid traverse of the table in either direction. From this it will be seen that it is necessary for the selector valve to have four positions in order to effect the four possible combinations between the channels 96 and 98 and the four ports leading from the pumps. This is accomplished by making the selector valve reciprocable to the right and left to obtain two positions and rotating the valve to a new angular position and reciprocating it to the left or right to obtain the other two positions.

The rotating and shifting of the selector valve is effected by power means such as hydraulic pressure under control of pilot valves to be explained later in connection with the operation of the machine. The work table 12 thus constitutes an hydraulically reciprocated slide capable of movement in either direction at feed or rapid traverse rates under automatic control.

The spindle carrier or ram 14 is provided with independent control valves but is supplied with pressure from the hydraulic unit 80. As shown in Figure 11, the spindle carrier is controlled by a reverse valve 100, a balancing valve 101 and a double throttle valve 102. Pressure is supplied to the reverse valve 100 from the previously mentioned channel 87 which is always under pressure as determined by the check valve 90 except when the pump is being utilized to rapid traverse the table. This pressure may be in the neighborhood of 150 pounds to the square inch. The channel 87 leads to the stop valve 75 through which the pressure flows to channel 103, which leads to the unloading valve 104. Connected to this valve is the return line 105, which leads back to the reservoir 81 in the hydraulic unit. With the unloading valve in the position shown in Figure 11, the oil in channel 103 will be immediately returned to reservoir and therefore no pressure will build up in the branch line 106 sufficient to open the check valve 107 connected to the supply line 108.

In order to limit excessive pressures building up in the channels 92 and 95 comprising the closed circuit, a differential valve 109 having ports 110 and 111 is coupled in parallel with the pump, the combined pressure of these two ports acting respectively on the end of the piston rod 112 and piston 113 to urge the same toward the right against the pressure of spring 114. Since the channel 92 is usually the high pressure side of the pump, an exhaust port 115 has been provided in the differential valve for coupling this side of the pump with exhaust. This exhaust, which is usually under a pressure of 400 or 500 pounds, is conducted through channel 116 to the stop valve 75, and then through channel 117 to the right hand end of the unloading valve 104 where it acts on the reduced end of the plunger 118 tending to shift the valve spool 119 to the left and thereby cut off the channel 103 from the return line 105. The pressure continues its flow through channel 120 to a resistance in the form of choke coil 121, and from there into the line 108. The line 108 is also connected to the port 122 formed in the left hand end of the unloading valve cylinder. With the parts in the position shown and assuming that the spindle carrier is stopped, there will be no flow in the channel 108. The high pressure fluid flowing through the resistance 121 will therefore eventually build the pressure up in line 108 until there will be no drop in pressure across the resistance and the pressure in line 108 will equal the pressure in channel 120. Due to the difference in the end areas of the spool 119, the end adjacent port 122 being the larger, there will be a difference in total pressure, if the pressure per square inch is the same in opposite ends and the spool 119 will be shifted to the right, thus connecting channels 103 and 105.

A relief valve 123 is connected to the line 117 and a relief valve 124 is connected to the line 108 to permit more accurate adjustment and balance between the two channels. The purpose of the unloading valve is to maintain a pressure in the carrier actuating part of the circuit at all times without causing labor on the pumps or excessive heating of the oil and at the same time to provide a large supply of oil under satisfactory pressure when the same is needed, for instance to effect quick traverse of the tool slide. In other words, the flow from the differential valve 109 is at comparatively small volume but at high pressure while the flow from the rapid traverse pump is at large volume but at comparatively lower pressure. When the rapid traverse pump is connected to reservoir by the valve spool 119, the pressure in channel 103 and its branch 106 naturally drops because of substantially no resistance to be overcome. The check valve 107 connecting channel 106 with 108 is therefore held closed by the high pressure in channel 108.

Channel 108 is connected to the spindle carrier reversing valve cylinder 100 by port 125 which, with the valve in the position shown in Figure 11 is connected to port 126 and its channel 127, which channel leads to the throttle valve 102, a branch line 128 thereof being connected to the end of the throttle valve cylinder to maintain the valve plunger normally in a projected position. With the valve plunger in this position, a port 129 of channel 127 is closed off and the pressure all flows through port 130, groove 130', channel 131, to port 132 of the reverse valve. The fluid continues around the groove 133 in the valve to channel 134 which connects with the rear end of the cylinder 69. This position of the valves will cause rapid traverse movement of the tool head toward the work table.

The fluid in the opposite end of the cylinder 69 returns through channel 135 to port 136 of the reverse valve 100 which is connected at this time to the port 137 of return line 138. Since the channel 131 is under pressure, as previously explained, the balancing valve 101 will have its plunger moved upward, as shown in Figure 11, by the pressure flowing in branch line 139 to the lower end of the cylinder 101. In this upward position, the plunger will couple channel 138 with the return line 140 which eventually flows into the main return line 105.

As the slide 14 moves inwardly or towards the work, a dog 141 carried thereby, Figures 4 and 14, causes axial shifting of the throttle valve thereby opening port 129 and causing pressure to flow through channel 142 to the opposite end of the balancing valve 101, shifting the same axially to the position shown in Figure 11. This diverts some of the flow from channel 127 to port 143, and return line 140, thereby reducing the forward pressure, and at the same time restricting the port 144 which retards the flow from channel 138 to reservoir. This increases the back pressure resistance in the cylinder 69 and lowers the forward or urging pressure. This mechanism thus makes it possible to automatically reduce the rapid traverse rate of slide 14 to a feeding rate.

If now at the end of the feeding movement the reverse valve 100 is shifted longitudinally, the pressure line 108 will be connected directly to port 136 thereby permitting unrestricted flow to the opposite end of cylinder 69 to effect rapid return. Channel 134 will also be connected to port 145 of the return line 146, which also leads to the main return line 105. It will thus be seen that this shifting movement entirely cuts out the flow to the throttle valve and makes it possible to effect a quick return of the tool head even although the throttle valve is held in a depressed position by means of the dog 141. This shifting of the reverse valve is controlled by a pilot valve similar to those for determining table movement.

There are four of these cycle control or pilot valves shown although any number may be utilized depending on the number of slides, the valve 147 constituting a by-pass valve, the valve 148 controlling the movement of the carrier reverse valve 100, and the valves 149 and 150 controlling the movement of the table selector valve 76. The shifting of the carrier reverse valve and the selector valve is effected by power; and pressure for this purpose is supplied by the variable delivery pump 79 through channel 151, which is a branch of the forward pressure line 92. This line extends to port 152 of the by-pass valve and when plunger 153 of this valve is in the position shown in Figure 11, fluid flows to the pressure ports 154, 155 and 156 of the valves 148, 149 and 150 respectively. A channel 157 connected to port 158 of the by-pass valve constitutes a return line direct to reservoir. The by-pass valve serves to connect pressure channel 151 to reservoir channel 157 thereby by-passing the high pressure fluid to reservoir which lowers the pressure throughout the system when the machine is stopped and saves laboring by the pump. The carrier reverse pilot valve 148 has a valve plunger 159, which in the position shown in Figure 11 couples the pressure port 154 with channel 160 leading to the carrier reverse valve shifting plunger 161. It also connects the return line 162 from the other shifting plunger 163 to the return line 164. If the valve is now shifted to the left, the pressure port 154 will be connected to channel 162 while the channel 160 will be connected to the return line, thereby effecting power shift of the carrier reverse valve axially upward from the position shown in the drawings.

The table pilot valve 149 has a plunger 166, which in the position shown connects the pressure port 155 with channel 167. This channel leads to the operating cylinder 168 of the selector valve 76 for shifting the valve longitudinally to the right. At the same time the line 169, leading from the opposite cylinder 170 is connected to the return line 164. Movement of the plunger 166 to the left will reverse these connections, pressure port 155 then being connected to channel 169, and line 167 being connected to the reservoir. It is thus seen that movement of this valve from one position to the other effects power axial shifting of the selector valve.

The pilot valve 150 has a plunger 171 which in the position shown connects the pressure port 156 with channel 172 leading to the operating cylinder 173 for effecting clockwise rotation of the selector valve. At the same time channel 174, leading from the selector valve operating cylinder 175, is connected to the return line 164. Movement of plunger 171 to the left will reverse these connections, the pressure port 156 being connected to channel 174 and the channel 172 being connected to return line 164, thereby affecting counter-clockwise rotation of the selector valve. It will thus be seen that by proper movements of the table pilot valves 149 and 150 that the selector valve may be power shifted to any one of its four possible positions for changing the rate and/or direction of movement of the table.

Figure 5:
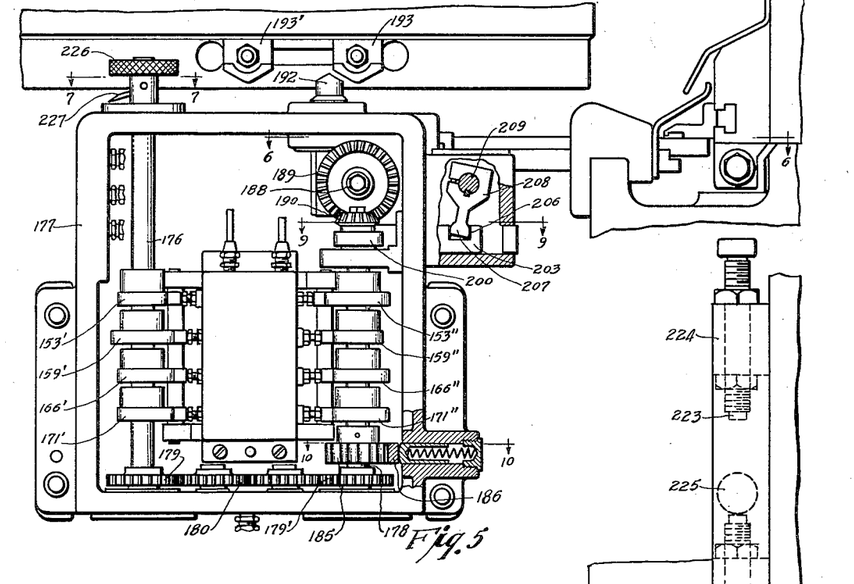
Figure 5 is an elevation of the control unit showing the pilot control valves in section.
Figure 15:
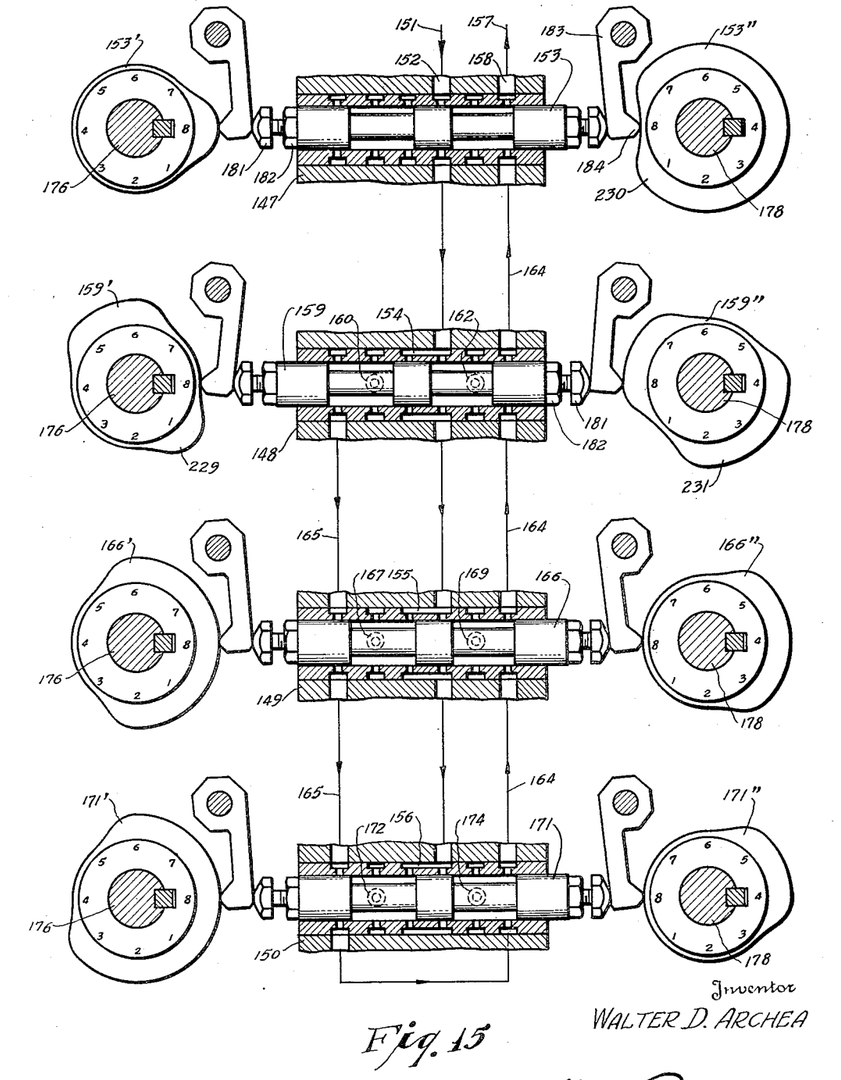
Figure 15 is a diagrammatic view of the control cams for the various pilot valves.
Figure 16:
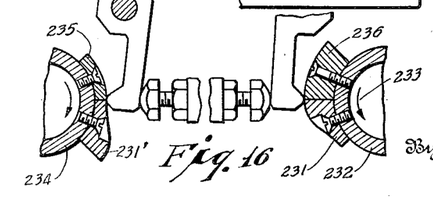
Figure 16 is a view showing a modified form of cam control for the pilot valves.

Means have been provided for positively shifting the pilot valves in either direction comprising a pair of cam means one of which is the opposite of the other, mounted at opposite ends of each valve. These cam means may comprise a control drum with cam segments detachably mounted therein as shown in Figure 16, one of which 231 may be in the form which if mounted on drum 232 rotating in the direction of arrow 233 will shift the valve plunger to the left. Another member 231 may be mounted on drum 234 but turned around to permit this movement to take place. If these cam members 231 are now turned around on their respective drums, they will effect positive movement of the plunger to the right. Additional cam pieces, 235 and 236 may be provided for maintaining the parts in either shifted position. Thus by providing only three different types of cam segments any desired series of movements of a particular plunger can be provided for. The cams may, however, be in one piece as shown in Figures 5 and 15. The valve plunger 153 of the by-pass valve is shifted by a pair of cams 153' and 153''; the plunger 159 is shifted by a pair of cams 159' and 159''; the valve plunger 166 is shifted by a pair of cams 166' and 166''; and the valve plunger 171 is shifted by a pair of cams 171' and 171''. The cams 153', 159', 166', and 171' are keyed for simultaneous rotation to the rotatable member or drum 176 which is journaled in the top and bottom walls of the housing 177. The cams 153'', 159'', 166'' and 171'' are keyed on the rotatable member or drum 178 for simultaneous rotation therewith. Since each pair of cams of each valve are opposites of one another, it is necessary that the drums 176 and 178 rotate through equal arcs simultaneously and to this end the lower portion of each is provided with gears 179 and 179' and these gears are connected together by an intervening gear train indicated generally by the reference numeral 180. By means of this mechanism rotation of either drum 176 or 178 will effect an equal amount of rotation in the other drum.

For purposes of adjustment, a bolt 181 is threaded in the opposite end of each valve plunger and provided with a lock nut 182. There is also provided between each bolt and its actuating cam, a pivoted arm 183 having a pawl shaped end 184. The pawl engages the periphery of the cam, while the back of the arm or lever engages the end of the adjusting bolt. This intervening lever prevents the possibility of any lateral thrust being exerted on the particular plunger being actuated, as by a sharp rise in the contour of the cam, and insures straight line thrust on the valve.

There are eight different combinations or positions that the pilot valves assume during the execution of one cycle of the machine and therefore the cams must assume eight different positions irrespective of whether they shift their respective valve plungers in each position or not.

In order to maintain the drums 176 and 178 and their accompanying cams in each one of these eight positions as they are reached, a detent mechanism has been provided comprising a star wheel 185 which is keyed to the lower end of drum 178 and maintained in position by the spring pressed pawl 186. As shown in the drawings, the star wheel is provided with eight indentations and upon movement through one-half of the angle between a pair of indentations, the pawl 186 under pressure of the spring 187 will act to complete the movement. Although eight indents have been shown, it will of course be understood that as many indents may be provided as the necessities of the particular operation to be performed by the machine require.

Figures 6, 7:
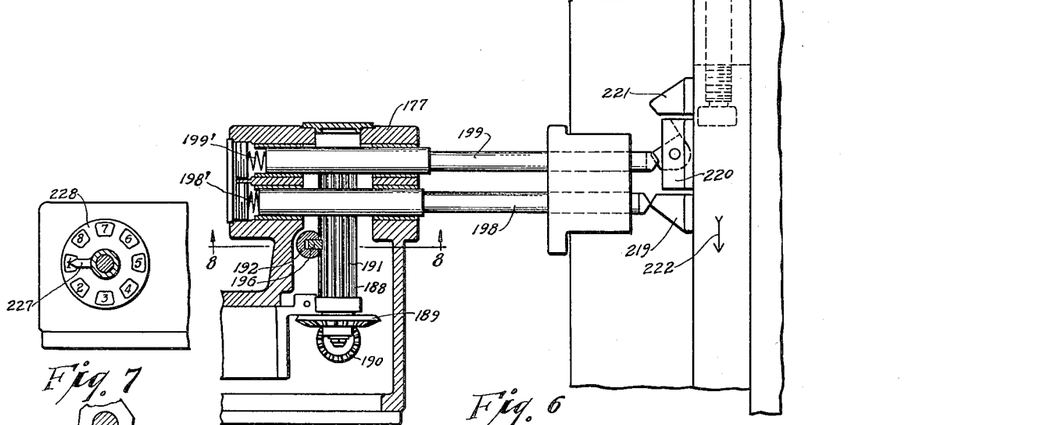
Figure 6 is a plan view on the line 6—6 of Figure 5.
Figure 7 is a detail view of the dial accompanying the manual control lever for the pilot valves taken on the line 7—7 of Figure 5.
Figure 8:
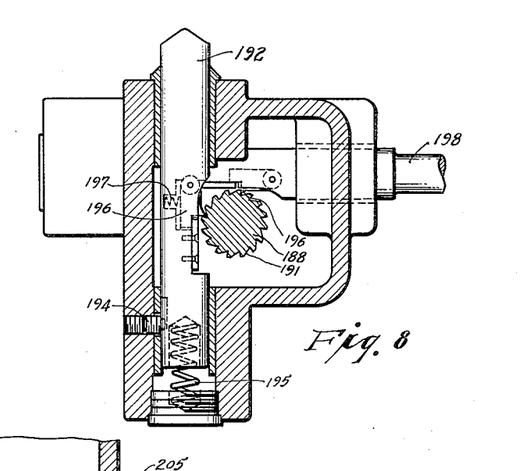
Figure 8 is a section on the line 8—8 of Figure 6.

Rotation or indexing of the drums 176 and 178 and their accompanying cams is automatically effected by a ratchet mechanism illustrated more particularly in Figures 6 and 8. A shaft 188 is journaled in the upper part of the housing 177 and provided on one end with a bevel gear 189 meshing with bevel gear 190 which is keyed or otherwise fastened to the upper end of drum 178. The shaft 188 is provided with a plurality of axially extending ratchet teeth 191, there being 16 of these teeth, but the ratio of the bevel gears 189 to 190 is two to one so that movement of the shaft 188 the angular distance of one tooth, or in other words one sixteenth of a revolution, will effect one eighth of a revolution in the cam drums. A plunger 192 is reciprocably mounted in the top of housing 177 adjacent the side of the tool carrier for actuation by dogs 193 and 193' adjustably mounted thereon. A set screw 194 engages a slot formed in the side of the plunger to limit its upward movement. A spring 195 is interposed between the bottom of the plunger and the lower end of the plunger bore to maintain it in an elevated position as determined by the set screw 194. A pivoted latch 196 is mounted in a groove in the side of the plunger 192 and held in a projecting position by a spring 197 for engaging the ratchet teeth on the shaft 188. It should be apparent from the drawings that downward movement of the plunger 192 by a dog 193 will rotate the shaft 188 one-sixteenth of a revolution, thereby rotating the cams and cam shaft one-eighth of a revolution. By means of this mechanism, the tool carrier may effect shifting of any or all of the pilot valves.

As shown in Figure 6, a second pair of plungers 198 and 199 are reciprocably mounted in the upper part of the housing 177 but in different horizontal planes and extend forward so that their ends are in a position adjacent to the side of the table for engagement by dogs carried thereby. As shown in Figure 8, each of these plungers is provided with a latch pawl 196 whereby axial movement of either one of these plungers to the left will effect an indexing movement in the shaft 188. Springs 198' and 199' serve to return the plungers to their extended position as limited by set screws similar to 194. From this it will be seen that it is also possible to effect indexing of the cams and shifting of the valves from the movement of the table as well as from the movement of the carrier. This makes it possible for either slide to initiate movement of the other or control its own movement.

Figure 9:
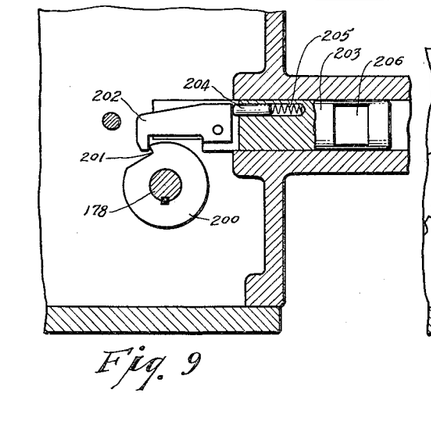
Figure 9 is a section on the line 9—9 of Figure 5.
Figure 10:
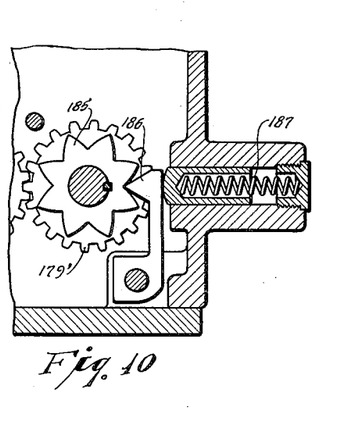
Figure 10 is a section on the line 10—10 of Figure 5.

When the by-pass valve plunger 153 has been moved to a neutral or stop position, all movement of the slides is terminated and it is therefore necessary for the operator to shift manually the cams in order to initiate the next cycle of the machine. There has, therefore, been provided a manual means for indexing the cam drums from a position adjacent the loading station as well as from a position at the opposite side of the machine. This mechanism is shown in Figure 9 and comprises a collar 200 keyed to the upper end of the drum 178 having a notch 201 cut in its periphery for engagement by the latch finger 202 pivoted to the end of the longitudinally shiftable plunger 203. A pin 204 is maintained in engagement with the finger 202 by a spring 205 which urges the finger into engagement with the periphery of the collar 200. A transverse slot 206 is cut in the plunger 203 in which is fitted the ball shaped end 207, Figure 5, of the crank arm 208 keyed on shaft 209. This shaft extends transversely of the machine and is provided with an operating lever 210 on each end thereof. Movement of this lever in a counter-clockwise direction will effect movement of the plunger 203 to the right as viewed in Figure 5, and thereby through the latch finger 202 rotation of the cam shafts.

The complete cycle of operation of the machine is best understood by referring to the diagram of Figure 13 in which the straight lines represent rapid traverse movements and the wavy lines represent feed movements. It will be noted from this figure that there are eight points of change either in rate of movement, or slide actuated, which are effected or controlled by the pilot valve cams. The various points on the cams have been numbered to correspond to the points of change illustrated in Figure 13.

Figure 2:
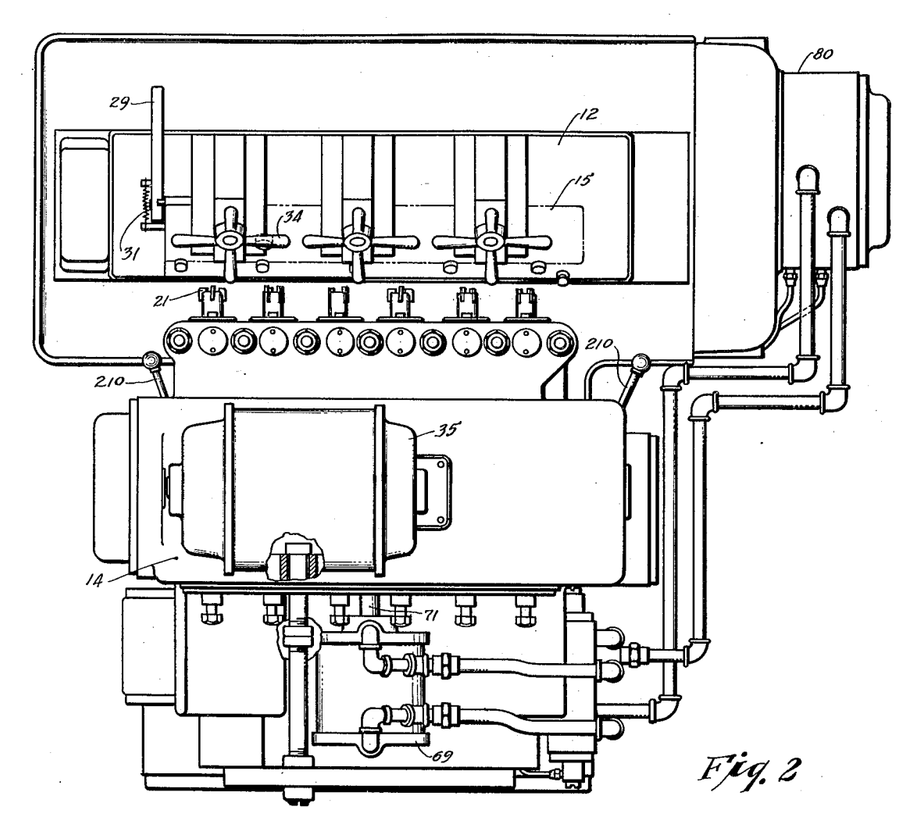
Figure 2 is a plan view of the machine shown in Figure 1.

When the machine is stopped at the end of a cycle, the number eight point on the cams will be in the position shown in Figure 15 and the table 12 will be shifted to the left as viewed in Figure 2 while the tool head or ram will be in a withdrawn or returned position with respect to the table.

After loading the machine the operator moves the control lever 210 toward the rear of the machine which thereby through the mechanism described in Figure 9 will effect rotation of the cam shafts thereby bringing the number 1 position on each cam opposite their respective valve plungers. As represented in Figure 13 by the straight line, this causes rapid traverse movement of the ram toward the table. This is due to the fact that the carrier reverse valve has been shifted by the lobe 229 on cam 159', and the by-pass valve shifted to the left by the lobe 230 on cam 153''. As previously explained, this will cause pressure to flow from port 154 to channel 160, moving the carrier reverse valve to the position shown in Figure 11. This starts a flow in channel 108 through port 125 to port 126 and channel 127 to the throttle valve. The initiation of flow in channel 108 will lower the pressure therein, because the small flow through the choke coil is not sufficient for replenishing purposes. The pressure at port 122 of the unloading valve will drop until the pressure on the end of plunger 118 is sufficient to shift the valve spool 119. This shifting will cut off the flow to reservoir from channel 103 causing a rise of pressure therein which will overcome check valve 107 and supply a large flow to channel 108.

The flow at the throttle valve will be branched at ports 129 and 130, part going to channel 143, and the other part to channel 131, port 132, channel 134 to the rear end of cylinder 69 as previously explained causing forward movement of the carrier.

Just before the cutters are ready to engage the work, it is necessary to cut the rapid traverse movement down to a feeding movement as shown by the wavy line at 2 in Figure 13. This is effected by the cam face 211 of dog 141 which engages a pin 212 projecting from the pivoted lever 213 having an arm 214 engaging the end of the valve plunger 215 of the throttle valve 102. This effects longitudinal movement of the throttle valve and cuts down the rapid traverse rate to a feed rate in the manner previously explained.

As the cutters approach the desired depth, the dog 193' Figure 5, engages the plunger 192 which through the ratchet mechanism ratchets the cam drum to bring number 2 position of the cams opposite their respective valve plungers. By referring to Figure 15, it will be noted that all of the valves remain in the same position with the exception of the carrier reverse valve which is now shifted longitudinally to the left by the lobe 231 on cam 159''. This connects the pressure port 154 through channel 162 which effects axial shifting upward of the carrier reverse valve and this couples the pressure port 125 with port 136 and channel 135 leading to the forward end of the cylinder 69. The ram now returns at a rapid traverse rate as shown by the diagram in Figure 13 until dog 193, Figure 5, engages plunger 192 which again ratchets the cams and brings the number 3 position opposite the valves. From Figure 15, it will be noted that in this position the lobe on cam 166'' will shift the valve 166 to the left while all the other valves remain in the same position.

Attention is invited at this point to the fact that the carrier reverse valve is not moved at this time, the pressure still remaining in the forward end of cylinder 69 tending to urge the ram away from the table, a positive stop 216 Figure 11 engaging a lug 217 projecting from the carrier, limits this movement. An additional positive stop 218 is also provided for limiting the forward movement of the tool carrier, thereby insuring a uniform depth of cut.

The shifting of the table pilot valve plunger 166 to the left couples the pressure port 155 to channel 169 thereby supplying pressure to the operating cylinder 170 and shifting the selector valve to the left, this movement being possible due to the fact that the opposite operating cylinder 169 has its channel 167 connected to the return line 165. The pilot valve plunger 171 has been up to this time in a right hand shifted position, coupling pressure port 156 with channel 172 which effected a clockwise rotation of the selector valve. The selector valve is therefore moved to a left hand clockwise shifted position, which effects rapid traverse movement of the table to the right as viewed in Figure 2. The table is provided with three dogs 219, 200 and 221. The dog 220 is a pivoted or latch dog and upon movement of the table in the direction of the arrow 222, the plunger 198 will engage the dog 220, thereby effecting another ratcheting of the pilot valve control cams. This will bring number four position opposite to the valve plungers and the only movement effected will be a shifting of the valve 171 to the left by the lobe on cam 171''. This will couple the pressure port 156 with the channel 174 and couple the channel 172 to the reservoir line 164, thereby effecting a counter-clockwise rotation of the pilot valve without longitudinal movement. This new position of the pilot valve will disconnect the rapid traverse pump from the table and connect the feed pump 79 thereto, thereby changing its rate of movement without effecting its direction. The table will now feed just a short distance toward the right until the stop screw 223 threaded in the lug 224 projecting from the side of the table engages the positive stop 225 which is fixed in the bed of the machine. At the same time the plunger 199 which is above plunger 198, and therefore will pass dog 220 without engagement therewith, will be shifted longitudinally by the dog 221 effecting another ratcheting of the cams and bringing up number 5. This new movement of the cams will shift valve 159 to the right which will in turn shift the carrier reverse valve 100 and connect the pressure port 125 with port 126 to effect a second rapid traverse forward movement of the carrier slide. This movement will continue until the dog 141 engages the pivoted member 213 acting on the plunger 215 of the throttle valve changing the rapid traverse movement to a feed movement. The feeding movement will continue until the lug 217 engages the positive stop 218 at which time the dog 193' will again depress plunger 192 and effect another ratcheting of the cams. This will bring up the sixth position of the cams, which will not effect the carrier reverse pilot valve, but will effect movement of both of the table pilot valves 149 and 150 shifting both of these valve plungers to the right. This will couple pressure port 155 with channel 167 shifting the selector valve longitudinally to the right and also couple the pressure port 156 with the channel 172 which will rotate the selector valve in a clockwise direction. In this position of the pilot valve the rapid traverse pump will be disconnected from one end of the table cylinder, and the pressure line of the feed pump connected to the other end, thereby effecting a feeding movement of the table in the return direction or to the left as viewed in Figure 2.

During this return movement, the plunger 198 will move past the latch dog 220 without being shifted thereby, and will continue until it is engaged by dog 219, which will effect longitudinal movement of the plunger 198 and thus through ratchet mechanism bring up the seventh position of the cams. By referring to Figure 15, it will be seen that the only movement effected by the seventh position of the cams is a shifting of the carrier reverse pilot valve 148 to the left which will connect the pressure port 154 to channel 162 thereby shifting the carrier reverse valve upward and coupling the pressure port 125 to the channel 135 causing a rapid return movement of the carrier slide. This carrier return movement will continue until the dog 193 engages the plunger 192 which will ratchet the cams to the eighth position thereby shifting the by-pass valve to the right and stopping further movement of the machine.

The shaft 176 has been provided with a manual control knob 226 having integral therewith a pointer 227 which registers with a dial 228 shown in Figure 7 by means of which the pilot valve control cams may be moved to any position to start the machine at any point in the cycle. This is convenient for set-up purposes or for any other reason in which it is desired to skip intervening stations for adjustments or otherwise.

There has thus been provided a machine tool which is capable of milling elongated slots or performing other machining operations comprising relative movement between the tool and work in a plurality of directions in a single automatic cycle thereby saving considerable time and reducing the operator's duties to simply loading the machine and starting the same. It will further be noted that a machine has been produced having a plurality of reciprocable slides in which either slide is capable of modifying or varying its own movement or initiating movement of a stationary slide. The pilot valve control cams or drums may be changed to vary the sequence of cyclic movement as the movements illustrated herein have been for descriptive purposes only and are not to be considered as limitations.

What is claimed is:

1. A milling machine having a support, a plurality of pressure actuated slides mounted on the support, control valves for the slides, automatic valve positioning means for determining the cycle of slide movement including a plurality of pilot valves for determining power shifting of the control valves, an indexible drum, cam means on the drum for shifting said pilot valves, said drum having a plurality of stations, detent mechanism for positioning the drum at each station, and indexing means operated by the moving slides for moving the drum from station to station.

2. A milling machine having a support, a plurality of pressure actuated slides reciprocably mounted upon the support, a plurality of pilot valves for controlling and determining the movement of the slides, an indexible control drum, cam means on the drum for shifting said pilot valves in predetermined succession, and means to index the drum from the slides, including a ratchet wheel, a plurality of plungers, a pawl on each plunger engaging the ratchet wheel, said plungers extending to the various slides, and dogs carried by the respective slides for shifting particular plungers adjacent thereto whereby movement of any slide may be utilized to effect indexing of said drum.

3. A milling machine having a plurality of movable slides, a control drum for determining the sequence of actuation of said slides and thereby the cycle of the machine, said drum being positionable at a definite number of stations per revolution thereof, and indexing mechanism for positioning the drum, including a ratchet wheel having a number of ratchet teeth thereon, gearing coupling the ratchet wheel to the drum, and a star wheel associated with the drum having a predetermined number of detents therein corresponding to the number of drum stations, the ratio of said gearing being the number of detent teeth divided by the number of ratchet teeth.

4. A milling machine having a plurality of pressure actuated slides, a source of pressure, an individual reverse valve interposed between the source of pressure and each slide, pilot control valves for determining the pressure shifting of the reverse valves, and positive means actuated by movement of said slides for shifting the pilot valves including a pair of cams for each plunger mounted at opposite ends thereof and of opposite contour to one another, and means interconnecting said cams for rotation in opposite directions.

5. A milling machine having a plurality of pressure actuated slides, a source of pressure, an individual reverse valve interposed between the source of pressure and each slide, pilot control valves for determining pressure shifting of said reverse valves, positive means actuated by movement of said slides for shifting the pilot valves in predetermined order including a pair of cams for each plunger mounted at opposite ends thereof, said cams being of opposite contour to one another, and manual means for positioning said cams to initiate the machine cycle at any point thereof.

6. A milling machine having a plurality of pressure actuated slides, a source of pressure, a reverse valve interposed between the source of pressure and each slide, pilot control valves for determining pressure shifting of the reverse valves and positive means controlled by the movement of said slides for shifting the pilot valves including a pair of cams for each plunger mounted at opposite ends thereof and of opposite contour to one another, manual means for adjusting said cams to initiate the machine cycle at any point thereof, and means to indicate the position of the manual adjusting means.

7. In a milling machine having a plurality of pressure actuated slides, a source of pressure therefor including a pressure line and individual control valves for each slide, pilot valves for determining power shifting of the control valves, a branch line coupling the pressure to said pilot valves, a by-pass valve in the branch line, a control drum indexibly mounted in cooperation with said pilot and by-pass valves, cam means on the drum for positioning said valves in predetermined combination, one rotation of the drum constituting a machine cycle, and means on the drum effective at the end of each cycle to shift said by-pass valve to disconnect the pressure line from said pilot valves, and thereby lower the pressure in the system during idling of the machine.

8. A machine tool having a reciprocating slide, means for effecting reciprocation of the slide including a piston and cylinder, a source of pressure, a power shifted reverse valve interposed between the source of pressure and said slide, a channel extending from the reverse valve to one end of the cylinder and connectible with pressure by the valve to effect forward movement of the slide, a second channel extending from the reverse valve to the opposite end of the cylinder and connectible with pressure by the valve to effect return movement of the slide, an automatic feed control valve in the first channel, and a pilot valve for effecting power shifting of the reverse valve to a slide return position to thereby short circuit the feed control valve and permit rapid return movement of the slide.

9. A machine tool having a movable slide, a channel extending to the slide for conducting pressure thereto, a source of pressure, a reservoir, means to couple the pressure with said line, valve means responsive to a rise in pressure in said line due to absence of flow therein to short circuit the pressure to reservoir and to automatically couple the pressure to said line upon drop of pressure therein below a predetermined point.

10. A machine tool having a plurality of pressure actuated slides, a selector valve for determining the rate and direction of movement of one of said slides, channels coupling the selector valve with its respective slide, a source of pressure coupled to the selector valve, branch lines leading from said source to the other slides for conducting pressure thereto, and a stop valve interposed in all of said lines and channels whereby upon movement of the valve in a predetermined direction it will disconnect the pressure from all of said slides and thereby stop operation of the machine.

11. In a milling machine having a plurality of pressure actuated slides, a source of pressure therefor including a forward pressure line, a control valve for each slide, pilot valves for determining power shifting of the control valves, a by-pass valve, a control drum indexibly mounted in co-operation with said pilot and by-pass valves, cam means on the drum for shifting said valves, one rotation of the drum constituting a machine cycle, means on the drum effective at the end of each cycle to shift said by-pass valve to by-pass the forward pressure line to reservoir, and thereby lower the pressure in the system, a starting lever on each side of the machine, means coupling the lever to said ratchet index mechanism for initiating movement of the control drum on the next cycle, and thereby shifting of the by-pass valve to raise the pressure in the system.

12. A milling machine comprising a support, two relatively movable slides mounted on said support, a cutter spindle journaled in one of said slides, a work holder mounted on the other slide, means to effect movement of one slide toward the other on a cutting stroke and a subsequent rapid separation thereof, means automatically actuated by the returning slide causing movement of the second slide along a transverse path to reposition the work relative to the cutter, control means automatically actuated by the last named slide to cause execution of a second cutting stroke by the first slide, automatic trip controlled mechanism for initiating return movement of the second slide to effect a machining operation along a path transverse to the direction of said first named cutting paths, and means for returning the first slide to starting position.

13. A milling machine having a support, a rotatable cutter spindle carried by the support, a power actuated transmission for effecting rotation of the spindle, a work table carried by the support, transmission means for effecting relative movement between the cutter and work in angularly related paths comprising a first hydraulic motor for effecting a forward feeding movement along one path, means to control automatically the rate of said feeding movement, a second hydraulic motor for effecting relative movement between the cutter and work along a second path normal to the first named path, trip controlled means operable at the completion of the return movement of the first slide to initiate movement along the second path and thereby present a new surface of the work to the tool, means operative at the completion of the positioning movement to initiate a second approach movement between the cutter and work and thereby a second cutting operation along a path parallel to the first, and means effective at the completion of the second cutting operation to cause return transverse movement between cutter and work at a feed rate, thus forming a surface which interconnects the two surfaces formed by the previous cutting operations.

14. A milling machine for forming elongated slots in a work piece comprising a support having a spindle carrier reciprocably mounted thereon, a work table mounted on the support for movement transversely of the spindle carrier, a tool spindle journaled in the carrier, a power transmission for effecting continuous rotation of the spindle, power actuated means for feeding the tool into the work to thereby form one end of the slot including an hydraulic motor, a source of pressure and automatically actuated reverser means for changing the effect of said motor to cause withdrawal of the spindle carrier, a second hydraulic motor coupled to the work table, valve means automatically actuated by withdrawal of the spindle carrier to couple the fluid pressure to the table motor and effect shifting of the work table in accordance with the length of slot to be formed, a positive stop for limiting said shifting movement, means automatically actuated as the table approaches the end of its movement to initiate a second feed movement of the spindle carrier to form the other end of the slot, and valve means operable by the spindle carrier to change the direction of flow to the table motor thereby causing a return movement of the table and removal of the material intermediate the ends of the slot.

15. In a machine tool for forming elongated configurations in a work piece having a cutter support and a work support, the combination of fluid operable means for effecting movement of each of said supports, a source of pressure, separate rate and direction control valves for each support, and a common stop valve for discontinuing flow to both of said means.

16. A machine tool having a support, a slide reciprocably mounted on said support, an hydraulic motor coupled to the slide for effecting reciprocation thereof, a first pump for supplying fluid to the motor at a feed rate, a second pump for supplying fluid to the motor at a rapid traverse rate, a rate and direction determining valve for selectively coupling the pumps to the motor, said valve being rotatable to determine pump selection and reciprocable to determine direction of slide movement, fluid operable means for positioning said valve, a first pilot valve for determining rotative movement, a second pilot valve for determining longitudinal movement, and trip actuated control means for sequentially positioning said pilot valves to determine the cycle of movement of said slide.

17. A machine tool having a support, a slide reciprocably mounted on said support, an hydraulic motor coupled to the slide for effecting reciprocation thereof, a first pump for supplying fluid to the motor at a feed rate, a second pump for supplying fluid to the motor at a rapid traverse rate, a rate and direction determining valve for selectively coupling the pumps to the motor, said valve being rotatable to determine pump selection and reciprocable to determine direction of slide movement, fluid operable means for positioning said valve, a first pilot valve for determining rotative movement, a second pilot valve for determining longitudinal movement, trip actuated control means for sequentially positioning said pilot valves to determine the cycle of movement of said slide, a branch line for supplying fluid to said pilot valves from one of said pumps and an additional control valve in said branch line operable to bypass said pump to reservoir when the slide is not moving.

18. In a machine tool having a work support and a tool slide movable toward and from the work support, the combination of means for effecting reciprocation of the tool slide including an hydraulic motor having forward and return pressure receiving ports, a fluid pressure supply line, a feed rate control device, a first valve means for coupling the pressure line selectively to return port of the motor or to the feed control device, and an additional valve means for connecting the forward port of the motor to the feed control device or to exhaust whereby the slide will move at a fast rate in one direction or a slow or feeding rate in the other direction.

19. In a milling machine having a work support and a spindle carrier movable toward and from the work support to effect a tooling operation, the combination of hydraulic means for effecting reciprocation of the spindle carrier including a pump, an hydraulic motor connected to the slide having a first and second port, a feed control element, a first valve means to selectively connect the first port of the motor to exhaust or to the pressure line, a second valve means for selectively connecting or disconnecting the pressure line to the feed control device, a third valve means to selectively connect the second port of the motor to the feed control device or to exhaust, and means to simultaneously move all of said valve means to their respective first positions whereby the slide will be moved in one direction at a feed rate, and automatically operable means for positioning all of said valve means in their respective second positions whereby the slide will be moved in a return direction at a rapid traverse rate.

20. A machine tool having a support, a work table mounted on the support, a tool slide carried by the support for movement toward and from the work table, fluid operable means for effecting movement of the tool support at a feeding rate during approach movement and at a rapid traverse rate during return movement including an hydraulic motor coupled to the slide, a constant delivery pump, a delivery channel for coupling the pump to the motor, means to connect the delivery channel to one end of the motor whereby the full volume of the pump will be utilized to effect rapid return movement of the slide, a feed throttle valve, means to automatically position the valve means at the end of a return stroke to couple the delivery channel to the feed throttle valve, additional valve means for coupling the feed throttle valve to the opposite end of the motor to feed the slide, a by-pass channel extending from the throttle valve to reservoir, and means to automatically position the throttle valve to divert part of the pressure supply to reservoir whereby a single pump may be utilized for feeding the slide in one direction, and quick traversing the slide in the other direction.

21. A machine tool having a fluid operable slide, a fluid delivery channel therefor, a first pressure supply line for maintaining said channel filled with fluid, said line having an hydraulic resistance therein, a second pressure supply line, control means in parallel with said resistance and responsive to the pressures at opposite ends of said resistance whereby when the pressures are equal, the second supply line will be disconnected from said channel and when the pressures are unequal the second supply line will be connected to said channel.

22. A machine tool having a fluid operable slide, a fluid delivery channel therefor, a first pressure supply line for maintaining said channel filled with fluid, said line having an hydraulic resistance therein, a second pressure supply line, control means in parallel with said resistance and responsive to the pressures at opposite ends of said resistance whereby when the pressures are equal the second supply line will be disconnected from said channel, and when the pressures are unequal the second supply line will be connected to said channel, said control means including a valve having unequal end areas respectively connected to opposite ends of said resistance.

23. A machine tool having a fluid operable slide, a fluid delivery channel therefor having a check valve therein, means connected to the channel between the check valve and slide to maintain a predetermined pressure in the channel, additional means to supply an operating fluid to the channel through the check valve, and means responsive to a drop in said predetermined pressure to connect automatically said additional means to the channel.

24. A machine tool having a first fluid operable slide, a pump having a forward and return line connectible with the slide for causing a feeding movement thereof and a second pump having a delivery channel connectible to the slide for causing a rapid traverse movement thereof, the combination of a second fluid operable slide, a fluid delivery channel therefor, means connected to one of the feed pump lines to maintain a predetermined pressure in the delivery channel, and means automatically operable upon a drop in said predetermined pressure to connect the delivery line of a rapid traverse pump for operation of said auxiliary slide.

WALTER D. ARCHEA.